US012429828B2

(12) United States Patent
Yamamoto et al.

(10) Patent No.: US 12,429,828 B2
(45) Date of Patent: Sep. 30, 2025

(54) WATCH

(71) Applicant: SEIKO WATCH KABUSHIKI KAISHA, Tokyo (JP)

(72) Inventors: Kosuke Yamamoto, Tokyo (JP); Kazumi Sakumoto, Tokyo (JP); Akihito Okumura, Tokyo (JP)

(73) Assignee: SEIKO WATCH KABUSHIKI KAISHA, Tokyo (JP)

(*) Notice: Subject to any disclaimer, the term of this patent is extended or adjusted under 35 U.S.C. 154(b) by 359 days.

(21) Appl. No.: 18/318,511

(22) Filed: May 16, 2023

(65) Prior Publication Data

US 2023/0400814 A1 Dec. 14, 2023

(30) Foreign Application Priority Data

Jun. 14, 2022 (JP) ................................ 2022-095631

(51) Int. Cl.
*G04C 9/08* (2006.01)
*G04B 19/06* (2006.01)

(52) U.S. Cl.
CPC ............... *G04C 9/08* (2013.01); *G04B 19/06* (2013.01)

(58) Field of Classification Search
CPC . G04C 9/08; G04C 3/14; G04C 3/146; G04B 19/06; H02P 8/30; H02P 8/02; H02P 8/34; H02P 6/182
See application file for complete search history.

(56) References Cited

U.S. PATENT DOCUMENTS

| | | | | |
|---|---|---|---|---|
| 10,122,310 | B2 * | 11/2018 | Li .......................... | H02K 33/04 |
| 10,197,972 | B2 | 2/2019 | Fukushima et al. | |
| 10,809,667 | B2 * | 10/2020 | Olwal .................... | G04B 19/04 |
| 11,650,545 | B2 * | 5/2023 | Koller .................. | G04B 19/046 368/37 |

* cited by examiner

*Primary Examiner* — Edwin A. Leon
(74) *Attorney, Agent, or Firm* — Crowell & Moring LLP

(57) ABSTRACT

An object of the invention is to prevent a positional deviation of a hand while reducing power consumption. A watch includes: a plurality of hands; a plurality of motors configured to drive or brake the plurality of hands, respectively; a pulse generation unit configured to supply, to the plurality of motors, a drive pulse for driving the hands and a lock pulse for braking the hands; and a control unit configured to control an operation mode including a normal hand movement mode and a tactile read mode, and the pulse generation unit supplies the lock pulse to the motors when the control unit shifts the operation mode to the tactile read mode.

12 Claims, 9 Drawing Sheets

WATCH

RELATED APPLICATIONS

This application claims priority to Japanese Patent Application No. 2022-095631, filed on Jun. 14, 2022, the entire content of which is incorporated herein by reference.

BACKGROUND OF THE INVENTION

1. Field of the Invention

The present invention relates to a watch.

2. Description of the Related Art

In the related art, a technique for reducing a positional deviation of a hand by detecting an impact on a watch and applying a braking force to the hand (for example, see JP6592011B) is disclosed.

The technique for reducing the positional deviation of the hand as described above can also be applied to a so-called tactile read watch in which a user can directly touch a hand.

However, depending on a speed reduction ratio of a train wheel that rotates the hand, a force for holding a position of the hand may be relatively small. In such a case, when the related-art technique as described above is applied, a braking force may be insufficient when the hand is touched and thus a positional deviation of the hand may occur. Since electric power is consumed to apply the braking force to the hand, it is preferable that the braking force is being applied for a short time.

SUMMARY OF THE INVENTION

It is an aspect of the present application to provide a watch capable of preventing a positional deviation of a hand while reducing power consumption.

According to the application, there is provided a watch including: a plurality of hands; a plurality of motors configured to drive or brake the plurality of hands, respectively; a pulse generation unit configured to supply, to the plurality of motors, a drive pulse for driving the hands and a lock pulse for braking the hands; and a control unit configured to control an operation mode including a normal hand movement mode and a tactile read mode, in which the pulse generation unit supplies the lock pulse to the motors when the control unit shifts the operation mode to the tactile read mode.

According to the application, the watch further includes an opening and closing switch configured to detect opening and closing of a cover for the hands, and the control unit shifts the operation mode to the tactile read mode by detecting, by the opening and closing switch, that the cover is opened.

According to the application, the watch further includes: a dial having a surface on which the hand moves; and a capacitance detection unit configured to detect a capacitance of the dial, and the control unit shifts the operation mode to the tactile read mode based on a change in the capacitance detected by the capacitance detection unit.

According to the application, in the watch, each of the motors is a two-coil motor including a first coil and a second coil, and the lock pulse excites only the first coil.

According to the application, in the watch, the control unit stops an output of the lock pulse after an electromotive force generated in the second coil due to rotation of a rotor of the motor is no longer detected during the output of the lock pulse.

According to the application, the watch further includes a hand position detection unit configured to detect a position indicated by the hand, the operation mode includes a hand position correction mode, and the control unit shifts the operation mode to the hand position correction mode after the output of the lock pulse ends, and performs time correction based on a detection result of the indicated position obtained by the hand position detection unit.

According to the application, there is provided a watch including: a plurality of hands; a plurality of two-coil motors each including a first coil and a second coil, and configured to drive or brake the plurality of hands, respectively; a pulse generation unit configured to supply, to the plurality of motors, a drive pulse for driving the plurality of hands and a lock pulse for braking the plurality of hands; and a control unit configured to control an operation mode including a normal hand movement mode and a tactile read mode, in which in the tactile read mode, in a standby state in which a circuit of the first coil is opened and a circuit of the second coil is closed, when the control unit detects an electromotive force generated in the second coil due to rotation of a rotor of the motor, the control unit causes the lock pulse to perform excitation.

According to the application, there is provided a watch including: a plurality of hands; a plurality of two-coil motors each including a first coil and a second coil, and configured to drive or brake the plurality of hands, respectively; a pulse generation unit configured to supply, to the plurality of motors, a drive pulse for driving the plurality of hands and a lock pulse for braking the plurality of hands; and a control unit configured to control an operation mode including a normal hand movement mode and a tactile read mode, in which in the tactile read mode, in a standby state in which at least one circuit of the first coil and the second coil is closed, when the control unit detects an electromotive force generated in the first coil or the second coil due to rotation of a rotor of the motor, only the first coil is excited by the lock pulse.

According to the application, the watch further includes a boosting unit configured to boost the lock pulse.

According to the application, in the watch, the control unit stops an output of the lock pulse after the electromotive force generated in the second coil due to the rotation of the rotor is no longer detected during the output of the lock pulse.

According to the application, the watch further includes a hand position detection unit configured to detect a position indicated by the hand, the operation mode includes a hand position correction mode, and the control unit shifts the operation mode to the hand position correction mode after the output of the lock pulse ends, and performs time correction based on a detection result of the indicated position obtained by the hand position detection unit.

According to the application, it is possible to prevent a positional deviation of the hand while reducing power consumption.

DETAILED DESCRIPTION OF THE PREFERRED EMBODIMENTS

Figure 1:
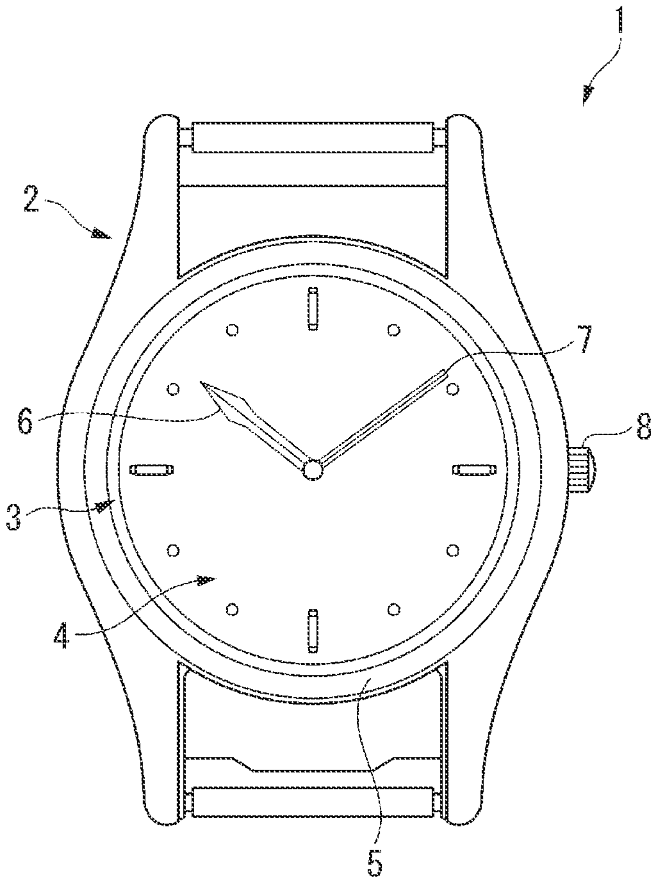
FIG. 1 is an external view of a watch according to the present embodiment.

Hereinafter, an embodiment of the invention will be described with reference to the drawings. In the following description, components having the same or similar functions are denoted by the same reference numerals, and description thereof may be omitted.

In general, a mechanical body including a drive portion of a watch is referred to as a "movement". A state in which a dial and hands are attached to the movement and the movement is put into a case to form a finished product is referred to as a "complete" of the watch. In the following description, the complete or movement of the watch is simply referred to as a watch.

FIG. 1 is an external view of a watch 1 according to the present embodiment.

As shown in FIG. 1, the watch 1 according to the present embodiment includes a case body 2, a cover 5, and a case back (not shown). A movement 3, a dial 4, an hour hand 6, and a minute hand 7 are provided inside a case formed by the case body 2, the cover 5, and the case back. In the following description, the hour hand 6 and the minute hand 7 are collectively referred to as a hand. The watch 1 according to the present embodiment is described as an hour and minute watch in which the hour hand 6 and the minute hand 7 are arranged coaxially, and the hour hand 6 and the minute hand 7 can be driven to rotate independently. The watch 1 may include a crown 8 for manually aligning the hand.

Figure 2:
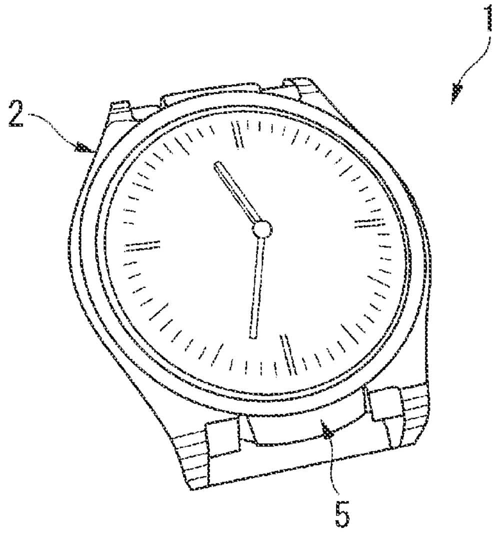
FIG. 2 is a view showing a state in which a cover of the watch according to the present embodiment is closed.

FIG. 2 is a view showing a state in which the cover 5 of the watch 1 according to the present embodiment is closed.

Figure 3:
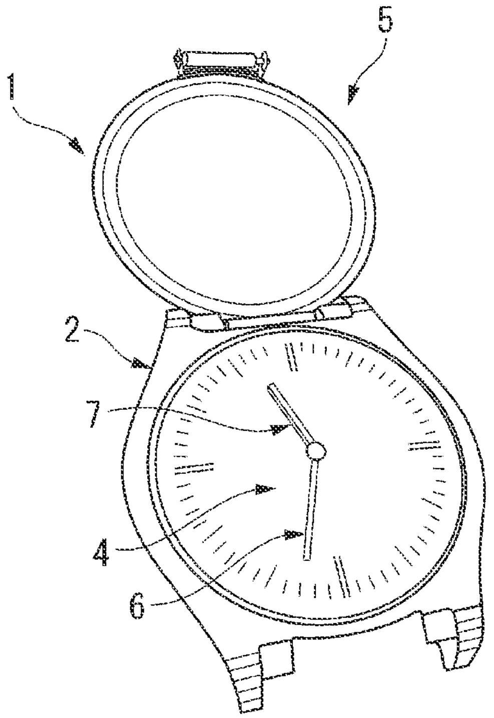
FIG. 3 is a view showing a state in which the cover of the watch according to the present embodiment is opened.

FIG. 3 is a view showing a state in which the cover 5 of the watch 1 according to the present embodiment is opened.

The watch 1 according to the present embodiment is a so-called tactile read watch in which a position of the hand (for example, time) can be read by a tactile sense of a part (for example, a finger) of a body.

The dial 4 includes protrusions on a surface thereof, indicating positions from 1 o'clock to 12 o'clock. For example, the dial 4 includes large protrusions at positions of 3 o'clock, 6 o'clock, 9 o'clock and 12 o'clock, and small protrusions at positions of 1 o'clock, 2 o'clock, 4 o'clock, 5 o'clock, 7 o'clock, 8 o'clock, 10 o'clock and 11 o'clock.

The hand moves with a center of the dial 4 as a center of rotation on the surface of the dial 4 as time passes.

The cover 5 includes, for example, a windshield glass, and functions as a cover for the hand. The cover 5 is of an open and close type. In the watch 1 according to the present embodiment, a user can directly touch the hand by opening the cover 5. The user can read the position of the hand (that is, current time) by touching the hand and the protrusions on the dial 4.

Functional Configuration of Watch

Figure 4:
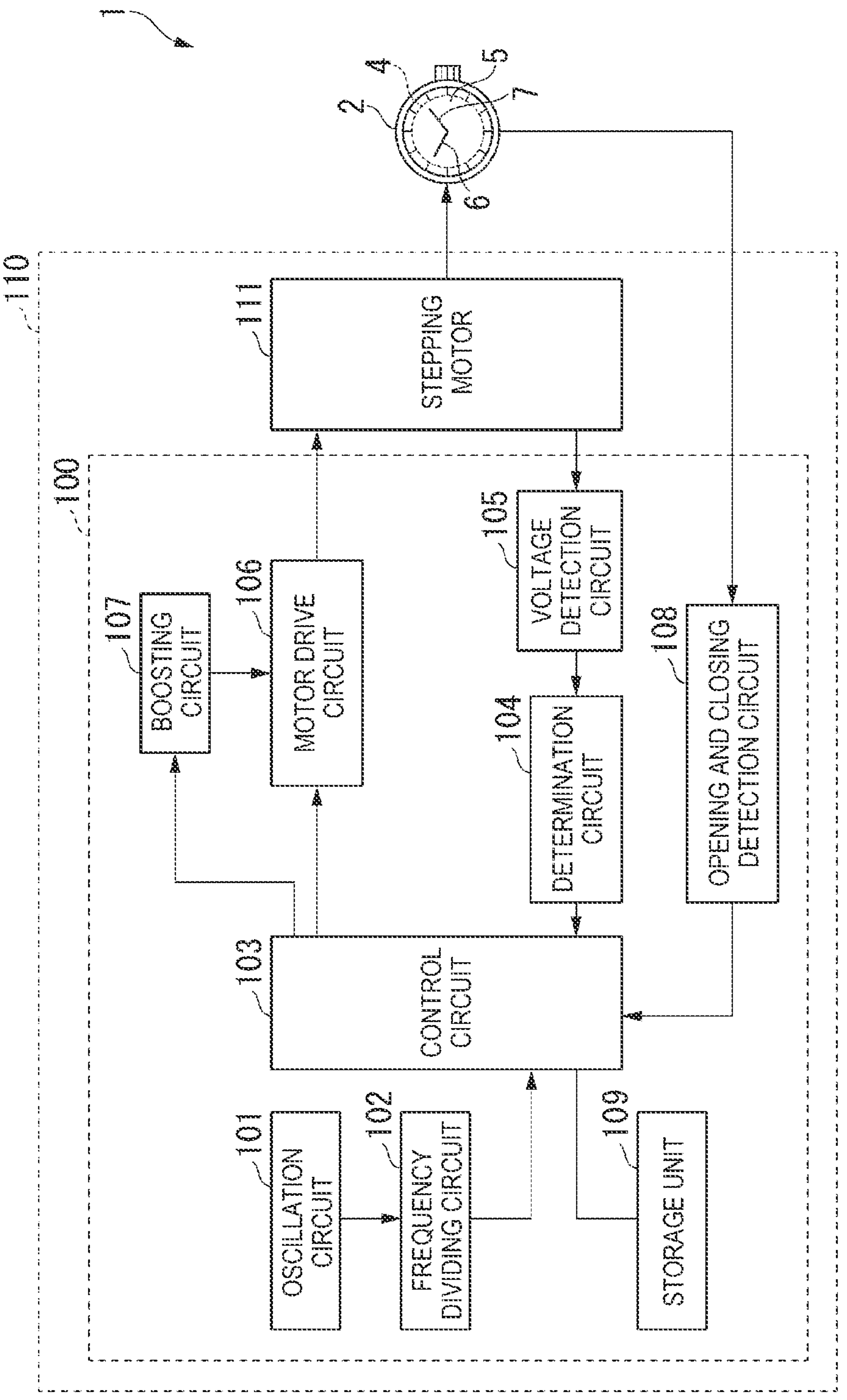
FIG. 4 is a diagram showing an example of a functional configuration of the watch according to the present embodiment.

FIG. 4 is a diagram showing an example of a functional configuration of the watch 1 according to the present embodiment. The functional configuration of the watch 1 will be described with reference to the drawing. The watch 1 includes an oscillation circuit 101, a frequency dividing circuit 102, a control circuit 103, a determination circuit 104, a voltage detection circuit 105, a motor drive circuit 106, a boosting circuit 107, an opening and closing detection circuit 108, a storage unit 109, a stepping motor 111, the case body 2, the dial 4, the cover the hour hand 6, and the minute hand 7.

Hereinafter, the oscillation circuit 101, the frequency dividing circuit 102, the control circuit 103, the determination circuit 104, the voltage detection circuit 105, the motor drive circuit 106, the boosting circuit 107, the opening and closing detection circuit 108, and the storage unit 109 are also collectively referred to as a stepping motor control circuit 100. The stepping motor control circuit 100 and the stepping motor 111 are also collectively referred to as a hand drive unit 110.

The oscillation circuit 101 generates a signal having a predetermined frequency and outputs the generated signal to the frequency dividing circuit 102. The frequency dividing circuit 102 divides the frequency of the signal output from the oscillation circuit 101 to generate a watch signal serving as a reference for time measurement, and outputs the generated watch signal to the control circuit 103. The control circuit 103 measures a current time based on the frequency-divided watch signal output from the frequency dividing circuit 102. The control circuit 103 outputs a control signal to each unit of the watch 1 based on a time measurement result to control an operation of each unit of the watch 1.

The storage unit 109 includes a storage element such as a flash ROM, and stores information such as the current time measured by the control circuit 103.

The motor drive circuit 106 acquires the control signal from the control circuit 103 and drives the stepping motor 111 based on the acquired control signal. The stepping motor 111 causes a pulse current output from the motor drive circuit 106 to flow through a drive coil (not shown) of a stator (not shown) to generate a magnetic field and rotate a rotor (not shown). Rotation of the rotor is transmitted to the hand through a train wheel. That is, the stepping motor 111 is driven by the motor drive circuit 106 to rotate the hand.

The stepping motor 111 includes a first stepping motor 111-1 and a second stepping motor 111-2 (both not shown).

The first stepping motor 111-1 rotates the hour hand 6. The second stepping motor 111-2 rotates the minute hand 7. The first stepping motor 111-1 and the second stepping motor 111-2 have different speed reduction ratios of train wheels each arranged between the rotor and the hand, but otherwise have the same configuration. In the following description, the first stepping motor 111-1 and the second stepping motor 111-2 are collectively referred to as the stepping motor 111 unless distinguished from each other.

That is, the watch 1 includes a plurality of hands. The watch 1 includes a plurality of motors that drive or brake the plurality of hands.

The boosting circuit 107 boosts (or does not boost) a voltage supplied from a power supply (for example, a battery (not shown)) under the control of control circuit 103, and supplies the boosted voltage to the motor drive circuit 106.

When the rotor of the stepping motor 111 rotates (or vibrates), the voltage detection circuit 105 detects an induced voltage generated in the drive coil of the stepping motor 111. The voltage detection circuit 105 outputs the detected induced voltage to the determination circuit 104.

The determination circuit 104 determines a rotation state of the rotor of the stepping motor 111 based on a state of the induced voltage detected by the voltage detection circuit 105. For example, the determination circuit 104 determines whether the rotor rotates (or vibrates) based on whether a voltage value detected by the voltage detection circuit 105 exceeds a predetermined threshold.

The opening and closing detection circuit 108 detects an open or closed state of the cover 5. For example, the opening and closing detection circuit 108 includes a detection switch (opening and closing switch; not shown) for detecting the open or closed state of the cover 5. The opening and closing detection circuit 108 outputs a detection result of the detection switch to the control circuit 103.

The detection switch may be a mechanical switch that mechanically detects the open or closed state, an electrical switch that detects the open or closed state based on opening and closing of an electrical contact or a change in capacitance, or an optical switch that optically detects the open or closed state.

Configuration of Motor Drive Circuit 106

Figure 5:
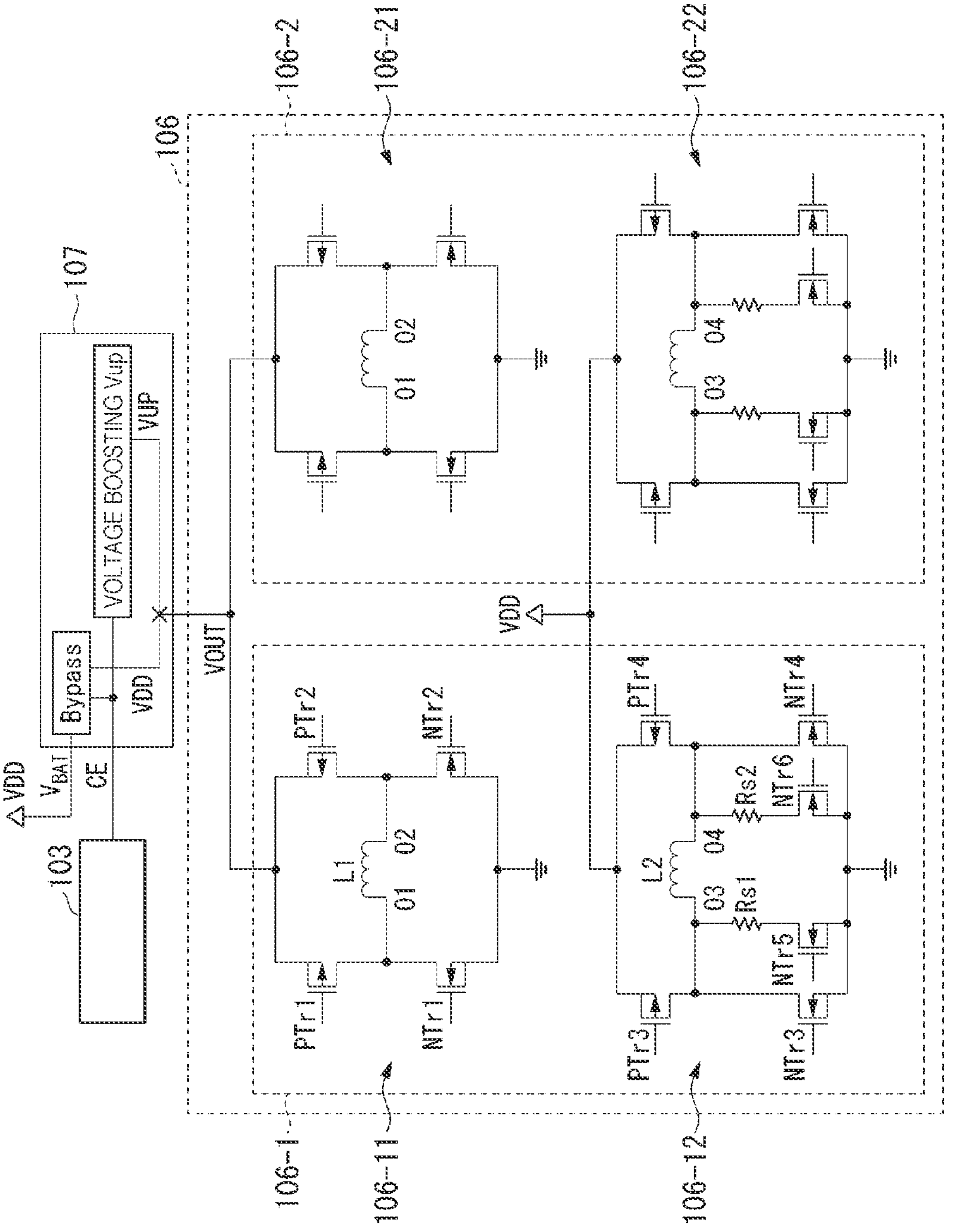
FIG. 5 is a diagram showing an example of a configuration of a motor drive circuit according to the present embodiment.

FIG. 5 is a diagram showing an example of a configuration of the motor drive circuit 106 according to the present embodiment.

The motor drive circuit 106 includes a first motor drive circuit 106-1 and a second motor drive circuit 106-2. The first motor drive circuit 106-1 drives the first stepping motor 111-1 to rotate the hour hand 6. The second motor drive circuit 106-2 drives the second stepping motor 111-2 to rotate the minute hand 7.

Since configurations of the first motor drive circuit 106-1 and the second motor drive circuit 106-2 are the same, the first motor drive circuit 106-1 will be described, and the description of the second motor drive circuit 106-2 will be omitted. In the following description, the first motor drive circuit 106-1 and the second motor drive circuit 106-2 are collectively referred to as the motor drive circuit 106 when not distinguished from each other.

The first stepping motor 111-1 is a two-coil motor including a first drive coil L1 (first coil) and a second drive coil L2 (second coil).

The first motor drive circuit 106-1 includes a first drive circuit 106-11 that supplies a pulse current to a first drive coil L1, and a second drive circuit 106-12 that supplies a pulse current to the second drive coil L2. The first drive coil L1 is connected to an output terminal O1 and an output terminal O2 of the first drive circuit 106-11. The second drive coil L2 is connected to an output terminal O3 and an output terminal O4 of the second drive circuit 106-12.

The boosting circuit 107 is connected to the first drive circuit 106-11.

When a boosting instruction CE is output from the control circuit 103 (for example, when the boosting instruction CE is high H), the boosting circuit 107 outputs a voltage VOUT obtained by boosting a power supply voltage VDD. In this case, the voltage VOUT boosted by the boosting circuit 107 is supplied to the first drive circuit 106-11.

When the boosting instruction CE is not output from the control circuit 103 (for example, when the boosting instruction CE is low L), the boosting circuit 107 does not boost the power supply voltage VDD (that is, the boosting circuit is bypassed), and outputs the voltage VOUT. In this case, the power supply voltage VDD is supplied to the first drive circuit 106-11.

The boosting circuit 107 is not connected to the second drive circuit 106-12. The power supply voltage VDD is supplied to the second drive circuit 106-12.

The first drive circuit 106-11 includes four switch elements, that is, a switch element PTr1, a switch element NTr1, a switch element PTr2, and a switch element NTr2, and constitutes an H-bridge that drives the first drive coil L1.

The control circuit 103 applies a pulse current to the first drive coil L1 by turning on or off each switch element.

The second drive circuit 106-12 includes four switch elements, that is, a switch element PTr3, a switch element NTr3, a switch element PTr4, and a switch element NTr4, and constitutes an H-bridge that drives the second drive coil L2.

The control circuit 103 applies a drive pulse to the second drive coil L2 by turning on or off each switch element.

The second drive circuit 106-12 includes a resistance element Rs1, a switch element NTr5, a resistance element Rs2, and a switch element NTr6. One end of the resistance element Rs1 is connected to the output terminal O3, and the other end thereof is connected to the switch element NTr5. One end of the resistance element Rs2 is connected to the output terminal O4, and the other end thereof is connected to the switch element NTr6.

When the rotor of the stepping motor 111 rotates (or vibrates), the voltage detection circuit 105 described above detects an induced current flowing through the second drive coil L2 based on a potential difference between both ends of the resistance element Rs1 or the resistance element Rs2.

Flow of Control Operation

Figure 6:
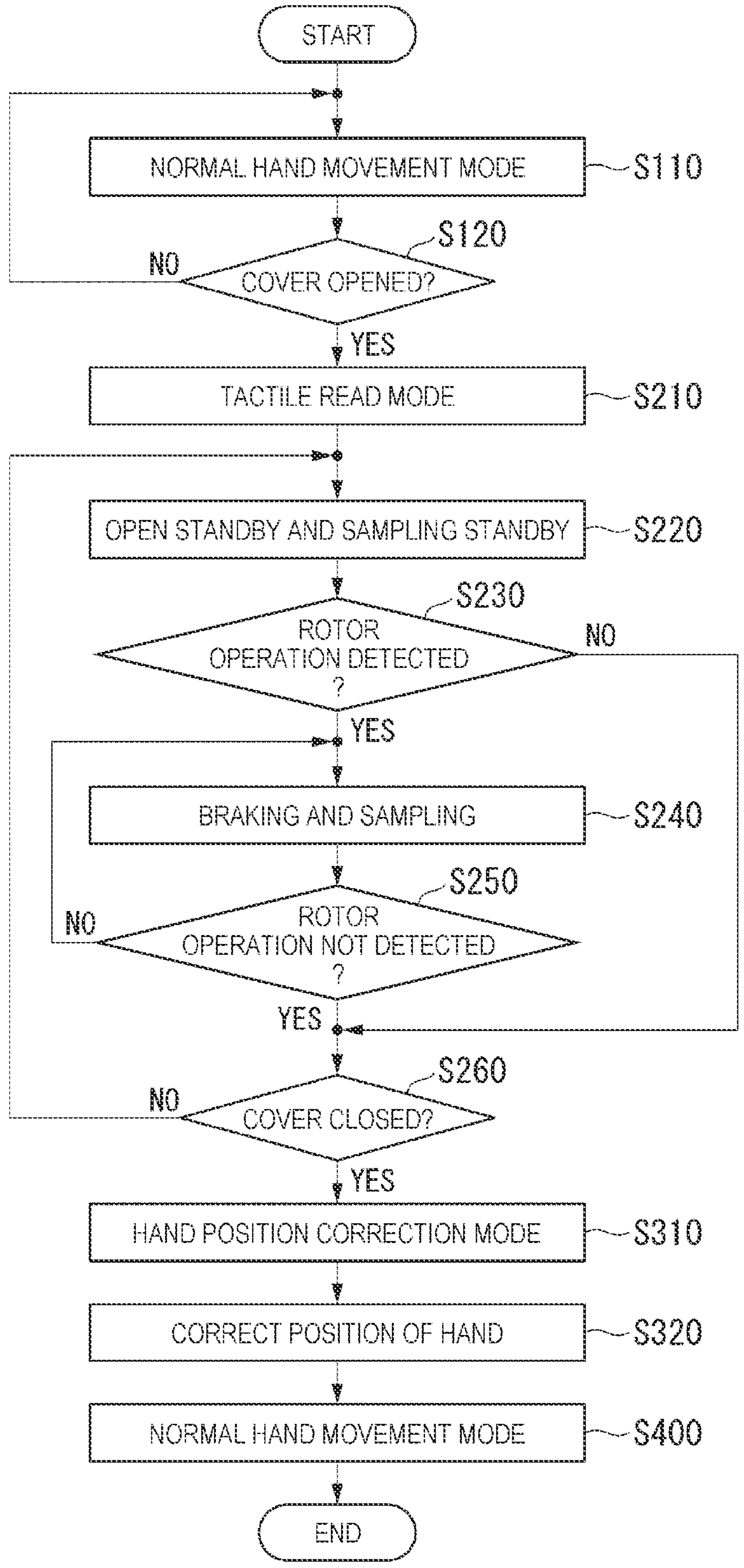
FIG. 6 is a diagram showing an example of a flow of a control operation by a control circuit according to the present embodiment.

FIG. 6 is a diagram showing an example of a flow of a control operation by the control circuit 103 according to the present embodiment.

The control circuit 103 (control unit) controls the watch 1 according to a plurality of operation modes. The operation modes include a normal hand movement mode, a tactile read mode, and a hand position correction mode.

The normal hand movement mode is an operation mode in which the hand is moved according to the passage of time.

The tactile read mode is an operation mode when the user may touch the hand or when the user touches the hand. In an example according to the present embodiment, hand movement of the hand is stopped in the tactile read mode. Further, in the tactile read mode, when the user touches the hand, the stepping motor 111 generates a braking force to make a position of the hand difficult to change.

The hand position correction mode is an operation mode in which, when a time indicated by the hand is different from an actual time, a position of the hand is detected and the position of the hand is corrected such that the time indicated by the hand coincides with the actual time.

Normal Hand Movement Mode (Step S110) The control circuit 103 drives the hand in the normal hand movement mode.

Figure 7:
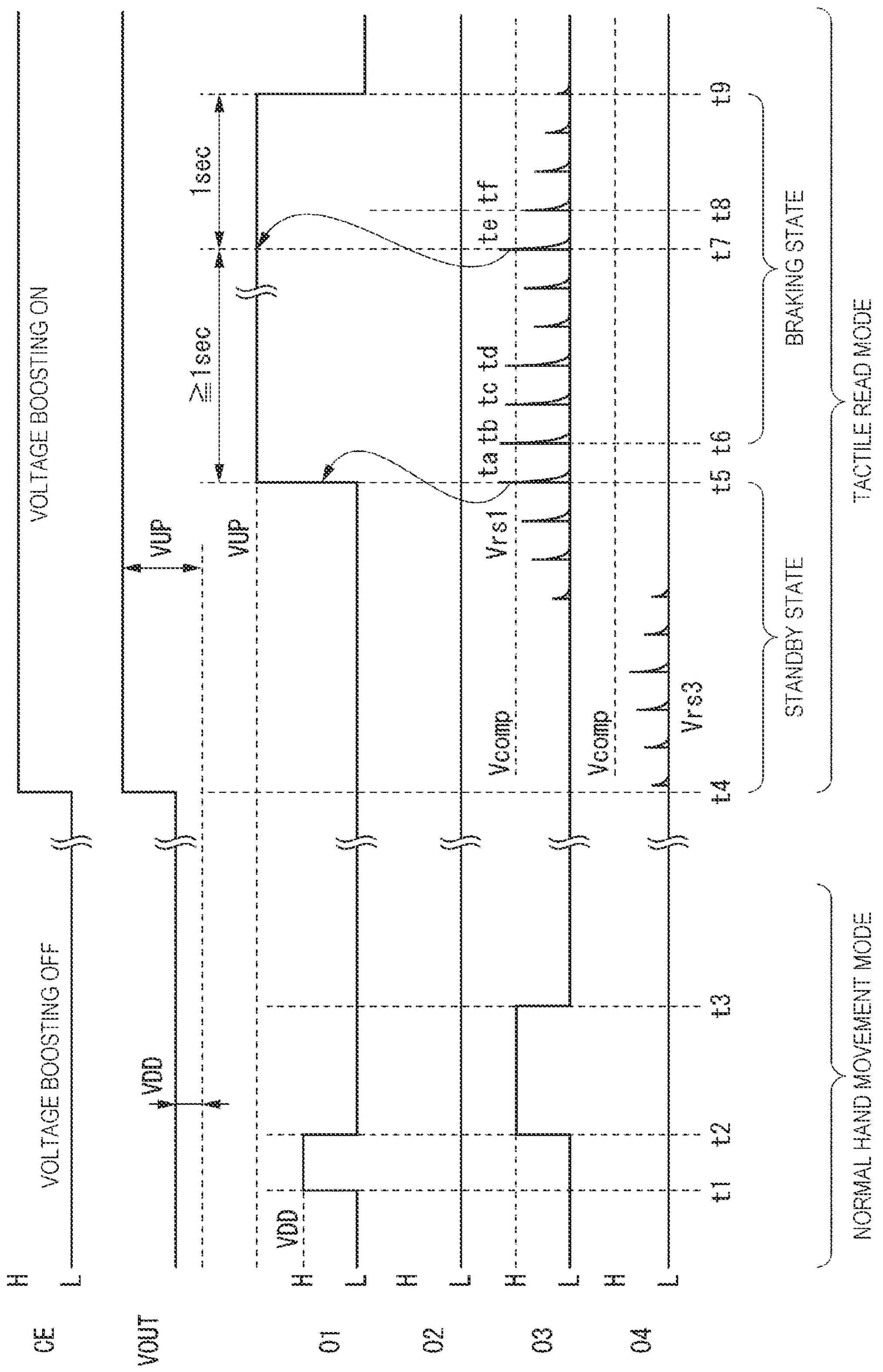
FIG. 7 is a diagram showing an example of operation waveforms in a normal hand movement mode and a tactile read mode.

FIG. 7 is a diagram showing an example of operation waveforms in the normal hand movement mode and the tactile read mode. In the normal hand movement mode, the control circuit 103 does not output the boosting instruction CE (for example, the boosting instruction CE is L). As a result, the power supply voltage VDD that is not boosted is supplied to the first drive circuit 106-11.

In the normal hand movement mode, a drive pulse is applied to the first drive coil L1 from a timing t1 to a timing t2, and a drive pulse is applied to the second drive coil L2 from the timing t2 to a timing t3, whereby the hand is moved.

The drawing shows an operation waveform for a half rotation of the rotor of the stepping motor 111. After the rotor rotates halfway, drive pulses (not shown) with reversed polarities are sequentially output from the first drive coil L1 and the second drive coil L2. As a result, the rotor rotates once.

(Step S120) With reference back to FIG. 6, the control circuit 103 determines whether the cover 5 is opened based on the detection result of the opening and closing detection circuit 108. When the control circuit 103 determines that the cover 5 is not opened (step S120; NO), the processing returns to step S110. When the control circuit 103 determines that the cover 5 is opened (step S120; YES), the processing proceeds to step S210.

That is, the control circuit 103 (control unit) shifts the operation mode to the tactile read mode when the detection switch (opening and closing switch; not shown) detects that the cover 5 (cover) is opened.

Tactile Read Mode (Step S210) The control circuit 103 switches the operation mode from the normal hand movement mode to the tactile read mode. In the tactile read mode, the control circuit 103 stops hand movement of the hand.

More specifically, the control circuit 103 stops the hand movement of the hand and stores, in the storage unit 109, a time at which the hand movement is stopped. The control circuit 103 continuously measures a current time while the hand movement is stopped.

As shown in FIG. 7, in the tactile read mode, the control circuit 103 outputs the boosting instruction CE (for example, the boosting instruction CE is H). As a result, the power supply voltage VDD is boosted and supplied to the first drive circuit 106-11. In an example according to the present embodiment, the boosted voltage VOUT is twice the power supply voltage VDD. For example, when the watch 1 uses a battery having a rated voltage of 3 V as an operation power supply, the power supply voltage VDD is 3 V, and the boosted voltage VOUT is 6 V.

In the tactile read mode, the control circuit 103 controls the stepping motor 111 in two states, a standby state and a braking state.

In the tactile read mode, the first drive circuit 106-11 functions as a brake that generates a braking torque on the hand. The second drive circuit 106-12 functions as a detection sensor that detects the movement of the hand.

(1) Standby State

Figure 8:
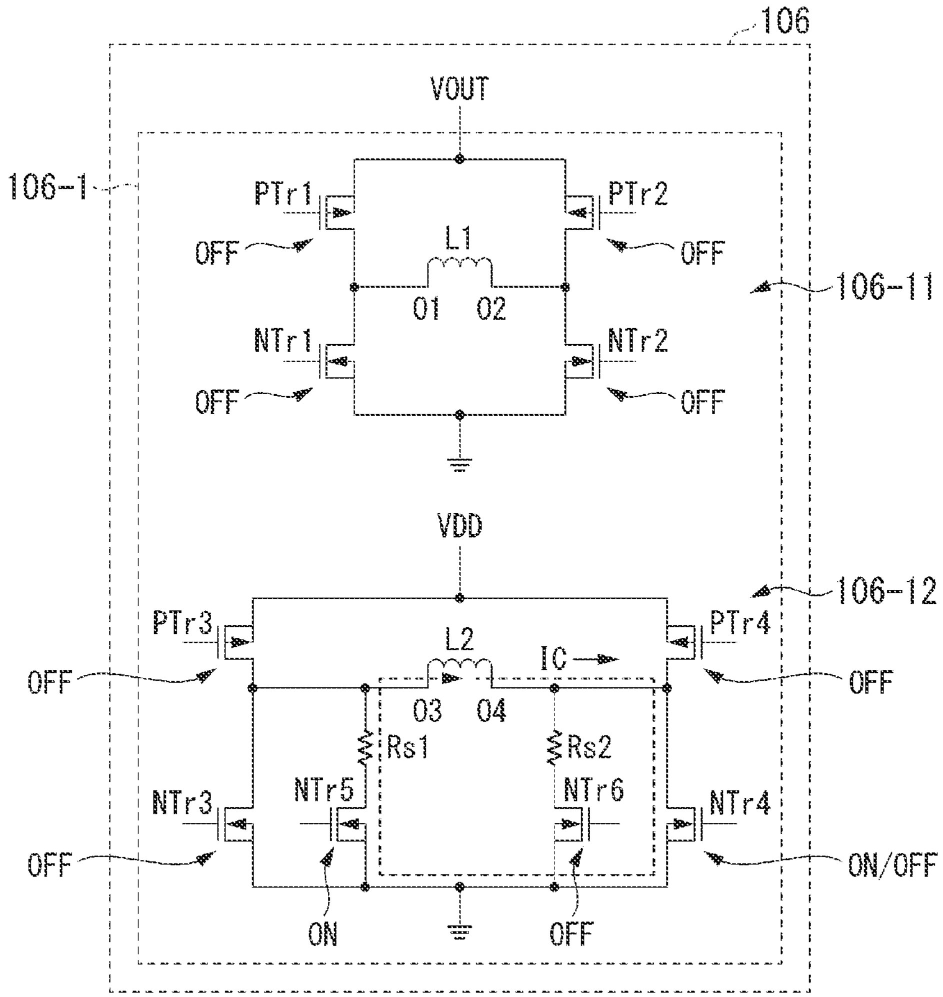
FIG. 8 is a diagram showing an example of a state of the drive circuit in a standby state according to the present embodiment.

FIG. 8 is a diagram showing an example of a state of the motor drive circuit 106 in the standby state according to the present embodiment.

In the standby state, the control circuit 103 turns off all the switch elements (the switch element PTr1, the switch element NTr1, the switch element PTr2, and the switch element NTr2) of the first drive circuit 106-11. As a result, the voltage VOUT is not supplied to the first drive coil L1. A state in which all the switch elements of the first drive circuit 106-11 are turned off is also referred to as an open standby state.

In the open standby state, no braking torque is generated by the first drive coil L1, and power consumption of the power supply (for example, battery) can be limited.

On the other hand, in the standby state, the control circuit 103 causes the second drive circuit 106-12 to function as the detection sensor that detects rotation (or vibration) of the rotor.

Here, when the rotation (or vibration) of the rotor occurs, an induced voltage is generated in the second drive coil L2. When a closed circuit including the second drive coil L2 is formed in the second drive circuit 106-12, an induced current IC corresponding to a magnitude of the induced voltage flows in the second drive circuit 106-12. The induced current IC flows through the resistance element (the resistance element Rs1 or the resistance element Rs2), and a potential difference between both ends of the resistance element is detected, whereby the rotation (or vibration) of the rotor can be detected. A state in which the induced voltage generated in the second drive coil L2 is detected is also referred to as a sampling standby state.

More specifically, in the standby state, the control circuit 103 turns off the switch element PTr3 and the switch element PTr4 among the switch elements of the second drive circuit 106-12.

The control circuit 103 turns on the switch element NTr5 and turns off the switch element NTr6. As a result, the resistance element Rs1 is connected to a GND potential.

The control circuit 103 turns on and off the switch element NTr4 repeatedly while the switch element NTr3 is turned off.

As a result, the voltage detection circuit 105 can detect the induced voltage generated in the second drive coil L2 by detecting a potential difference between both ends of the resistance element Rs1.

Although not shown in the drawing, after a predetermined time has elapsed, the control circuit 103 turns off the switch element NTr5 and turns on the switch element NTr6. As a result, the resistance element Rs2 is connected to the GND potential.

The control circuit 103 turns on and off the switch element NTr3 repeatedly while the switch element NTr4 is turned off.

As a result, the voltage detection circuit 105 can detect the induced voltage generated in the second drive coil L2 by detecting a potential difference between both ends of the resistance element Rs2.

The voltage detection circuit 105 detects the rotation (or vibration) of the rotor by alternately repeating detection by the resistance element Rs1 and detection by the resistance element Rs2.

One example of the standby state is shown from a timing t4 to a timing t5 in FIG. 7.

FIG. 7 shows an example of the induced voltage generated in the second drive coil L2 between the timing t4 and the timing t5.

(Step S220) With reference back to FIG. 6, the control circuit 103 sets the first drive circuit 106-11 to the open standby state and the second drive circuit 106-12 to the sampling standby state.

(Step S230) The control circuit 103 determines whether the rotor of the stepping motor 111 rotates (or vibrates) by the second drive circuit 106-12 in the sampling standby state.

For example, as shown in FIG. 7, the determination circuit 104 compares a predetermined determination threshold voltage Vcomp with the magnitude of the induced voltage generated in the second drive coil L2.

When the magnitude of the induced voltage generated in the second drive coil L2 exceeds the determination threshold voltage Vcomp, the determination circuit 104 determines that the rotor rotates (or vibrates). In the example of FIG. 7, at the timing t5, a magnitude Vrs1 of the induced voltage exceeds the determination threshold voltage Vcomp (pulse to in FIG. 7). In this case, the determination circuit 104 determines that the rotor rotates (or vibrates).

On the other hand, when the magnitude of the induced voltage generated in the second drive coil L2 is equal to or smaller than the determination threshold voltage Vcomp, the determination circuit 104 determines that the rotor does not rotate (or vibrate).

Only the second drive circuit 106-12 has an induced voltage detection function in an example according to the present embodiment, but the invention is not limited thereto. For example, only the first drive circuit 106-11 may have the induced voltage detection function, or both the first drive circuit 106-11 and the second drive circuit 106-12 may have the induced voltage detection function.

That is, in the tactile read mode, in the standby state (waiting state) in which at least one circuit of the first coil and the second coil is closed, the control circuit 103 (control unit) detects an electromotive force generated in the first drive coil L1 (first coil) or the second drive coil L2 (second coil) due to the rotation of the rotor of the stepping motor 111.

With reference back to FIG. 6, when the determination circuit 104 determines that the rotor rotates (or vibrates) (step S230; YES), the control circuit 103 advances the processing to step S240. When the determination circuit 104 determines that the rotor does not rotate (or vibrate) (step S230; NO), the control circuit 103 advances the processing to step S260.

(Step S240) The control circuit 103 brings the motor drive circuit 106 into the braking state.

(2) Braking State

Figure 9:
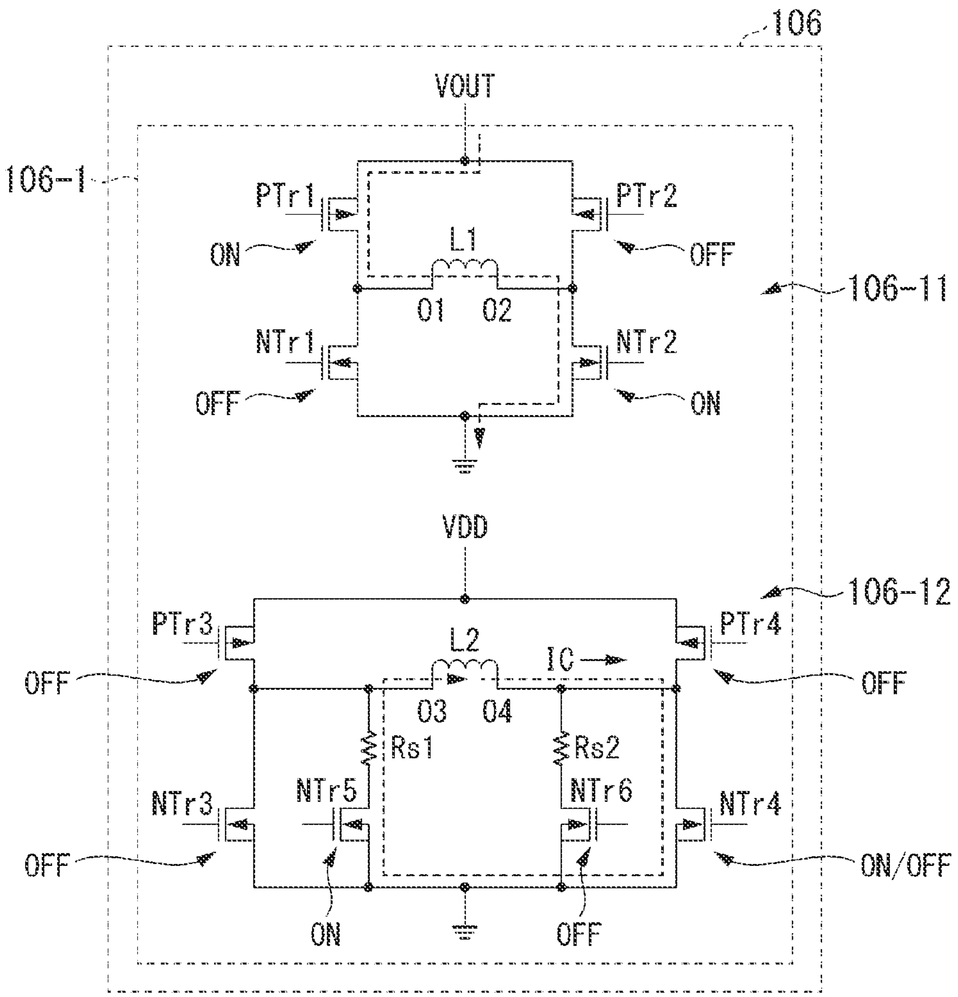
FIG. 9 is a diagram showing an example of a state of the drive circuit in a braking state according to the present embodiment.

FIG. 9 is a diagram showing an example of a state of the motor drive circuit 106 in the braking state according to the present embodiment.

In the braking state, the control circuit 103 turns on the switch element PTr1 and the switch element NTr2 and turns off the switch element NTr1 and the switch element PTr2, among the switch elements of the first drive circuit 106-11. As a result, a current is continuously supplied from the power supply to the first drive coil L1, and a braking torque is generated. The current supplied to the drive coil under the control of the motor drive circuit 106 in the braking state is also referred to as a lock pulse. A state in which the lock pulse is supplied to the drive coil under the control of the motor drive circuit 106 in the braking state is also referred to as a locked state.

In the braking state, the second drive circuit 106-12 is in the sampling standby state, and continuously detects the rotation (or vibration) of the rotor.

That is, the watch 1 includes the motor drive circuit 106 (pulse generation unit) that supplies a drive pulse for driving the hand and a lock pulse for braking the hand to each of the plurality of motors.

The motor drive circuit 106 (pulse generation unit) supplies the lock pulse to the stepping motor 111 (motor) when the control circuit 103 (control unit) shifts the operation mode to the tactile read mode.

Here, "when the operation mode is shifted to the tactile read mode" means either immediately after the operation mode is switched to the tactile read mode or after the operation mode is switched to the tactile read mode and enters the braking state.

As described above, the watch 1 includes the boosting circuit 107 (boosting unit) that boosts the lock pulse. In the tactile read mode, the boosted voltage VOUT is supplied to the first drive circuit 106-11. Therefore, a current value of the lock pulse supplied to the first drive coil L1 by the first drive circuit 106-11 is larger as compared with a case where the power supply voltage that is not boosted is supplied. Therefore, the control circuit 103 can more strongly brake the rotor in the tactile read mode.

As described above, each stepping motor 111 (motor) is a two-coil motor including the first drive coil L1 (first coil) and the second drive coil L2 (second coil). The lock pulse excites only the first coil among the first coil and the second coil. That is, in the braking state, the first drive circuit 106-11 is in the locked state, and the second drive circuit 106-12 is not in the locked state.

In the braking state, the second drive circuit 106-12 is described as being in the sampling standby state, but the invention is not limited thereto. In the braking state, both the first drive circuit 106-11 and the second drive circuit 106-12 may be in the locked state.

(Step S250) With reference back to FIG. 6, the control circuit 103 determines whether the rotor of the stepping motor 111 rotates (or vibrates) by the second drive circuit 106-12 in the sampling standby state.

For example, as shown in FIG. 7, the determination circuit 104 compares the predetermined determination threshold voltage Vcomp with the magnitude of the induced voltage generated in the second drive coil L2.

When the magnitude of the induced voltage generated in the second drive coil L2 exceeds the determination threshold voltage Vcomp, the determination circuit 104 determines that the rotor rotates (or vibrates).

In the example of FIG. 7, at a timing t6, the magnitude Vrs1 of the induced voltage exceeds the determination threshold voltage Vcomp (pulse tb in FIG. 7). In this case, the determination circuit 104 determines that the rotor rotates (or vibrates).

At a timing t8, the magnitude Vrs1 of the induced voltage is equal to or smaller than the determination threshold voltage Vcomp (pulse tf in FIG. 7). In this case, the determination circuit 104 determines that the rotor does not rotate (or vibrate).

Once the determination circuit 104 determines that the rotor rotates (or vibrates), the determination circuit 104 continuously determines that the rotor rotates (or vibrates) for a predetermined time (for example, one second) regardless of the magnitude of the induced voltage Vrs1.

The determination circuit 104 determines that the rotor does not rotate (or vibrate) at a time when the magnitude of the induced voltage Vrs1 is equal to or smaller than the determination threshold voltage Vcomp continuously for a predetermined time (for example, one second) or longer (for example, timing t9 in FIG. 7).

With reference back to FIG. 6, when the determination circuit 104 determines that the rotor rotates (or vibrates) (step S230; YES), the control circuit 103 returns the processing to step S240 and continues the braking state. When the determination circuit 104 determines that the rotor does not rotate (or vibrate) (step S230; NO), the control circuit 103 releases the braking state and advances the processing to step S260.

That is, the control circuit 103 (control unit) stops an output of the lock pulse after the electromotive force generated in the second drive coil L2 (second coil) due to the rotation of the rotor of the stepping motor 111 (motor) is no longer detected during the output of the lock pulse.

(Step S260) The control circuit 103 determines whether the cover 5 is closed based on a detection result of the opening and closing detection circuit 108. When the control circuit 103 determines that the cover 5 is not closed (step S260; NO), the control circuit 103 returns the processing to step S220. When the control circuit 103 determines that the cover 5 is closed (step S260; YES), the processing proceeds to step S310.

MODIFICATION

The normal hand movement mode is switched to the tactile read mode by opening the cover 5 in the above-described embodiment, but the invention is not limited thereto. For example, the watch 1 may not include the cover 5. In this case, the watch 1 may switch from the normal hand movement mode to the tactile read mode when a finger of the user approaches (or touches) the dial 4.

Figure 10:
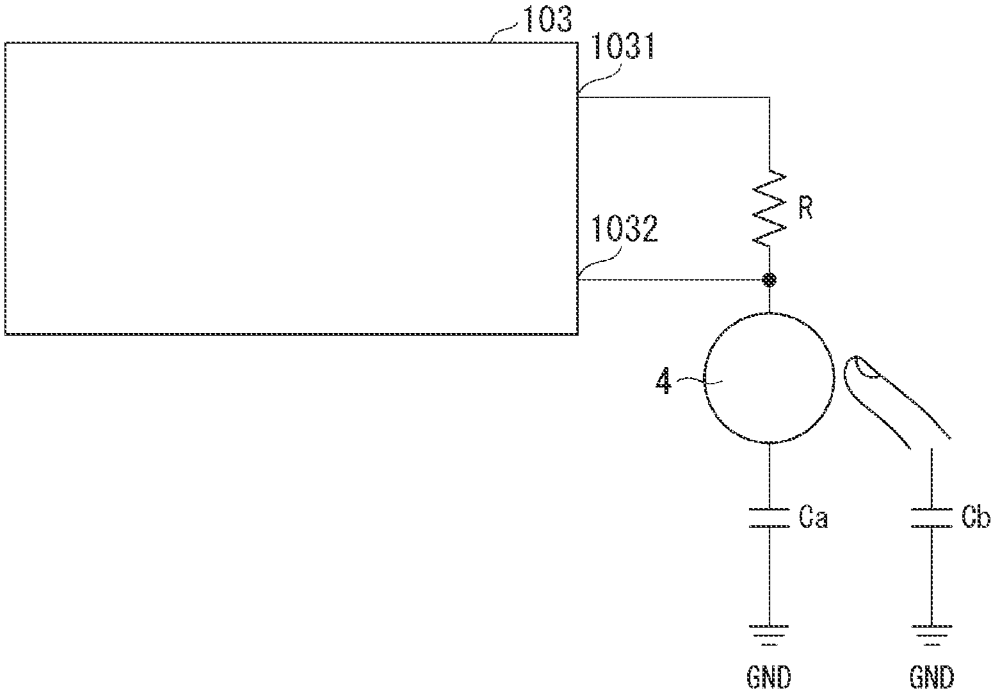
FIG. 10 is a diagram showing a modification of detection of switching to the tactile read mode.

FIG. 10 is a diagram showing a modification of detection of switching to the tactile read mode. In this modification, the control circuit 103 includes a detection voltage supply terminal 1031 and a capacitance detection terminal 1032. A detection resistor R is connected between the detection voltage supply terminal 1031 and the capacitance detection terminal 1032. The capacitance detection terminal 1032 is connected to the dial 4, and detects a change in capacitance between the dial 4 and the GND potential. For example, when the finger of the user does not touch the dial 4, a capacitance between the dial 4 and the GND potential is a capacitance Ca. When a capacitance between the finger of the user and the GND potential is a capacitance Cb, if the finger of the user approaches (or touches) the dial 4, a capacitance between the dial 4 and the GND potential is the capacitance Ca+the capacitance Cb. The control circuit 103 can determine whether the finger of the user approaches (or touches) the dial 4 by detecting the change in the capacitance.

In a case of this modification, when determining that the finger of the user approaches (or touches) the dial 4, the control circuit 103 switches the operation mode from the normal hand movement mode to the tactile read mode.

That is, the control circuit 103 functions as a capacitance detection unit that detects a capacitance of the dial 4. The control circuit 103 shifts the operation mode to the tactile read mode based on the change in the capacitance detected by the capacitance detection unit.

Hand Position Correction Mode

In the tactile read mode, the control circuit 103 stops the hand movement of the hand. Therefore, a position of the hand when the tactile read mode ends (that is, a time indicated by the hand on the dial 4) may be different from an actual time. When the tactile read mode ends, the control circuit 103 switches the operation mode to the hand position correction mode, and corrects the position of the hand to the actual time.

(Step S310) With reference back to FIG. 6, the control circuit 103 switches the operation mode from the tactile read mode to the hand position correction mode. In the hand position correction mode, there are two methods for correcting the position of the hand by the control circuit 103, a method based on a stored position of the hand and a method based on a detected position of the hand.

(1) Correction Based on Stored Position of Hand

The control circuit 103 reads, from the storage unit 109, a time stored in the storage unit 109 in step S210 (that is, a time when the hand movement of the hand is stopped). The control circuit 103 calculates a difference between the time read from the storage unit 109 and a current time during time measurement. The control circuit 103 corrects a position of the hand by outputting, from the motor drive circuit 106, a drive pulse corresponding to the calculated difference. As a result, the position of the hand coincides with the current time.

(2) Correction Based on Detected Position of Hand

The control circuit 103 detects a position of the hand. A known method such as position detection based on a torque change of a load gear or optical position detection using a photo sensor is used to detect the position of the hand.

In a case of a position detection method using a load gear, the load gear having a load tooth whose rotational load is different from other teeth is provided in a part of a train wheel (or a gear that rotates with rotation of a rotor outside the train wheel), and a position of the hand is detected based on a positional relationship between a position where the load tooth causes a torque change and the position of the hand.

In a case of a position detection method using a photo sensor, a detection gear whose optical characteristics are different from those of other portions depending on a rotational position (for example, a hole for light transmission is drilled at a predetermined position) is provided in a part of a train wheel (or a gear that rotates with rotation of a rotor outside the train wheel), and a position of the hand is detected based on a positional relationship between a position where an optical characteristic change occurs and the position of the hand.

The method for detecting the position of the hand is not limited to the above.

That is, the watch 1 further includes a hand position detection unit such as a load gear or a photo sensor that detects a position indicated by the hand. The operation mode includes the hand position correction mode, and the control circuit 103 (control unit) shifts the operation mode to the hand position correction mode after the output of the lock pulse ends, and performs time correction based on a detection result of the position indicated by the hand from the hand position detection unit.

If a force larger than the braking torque in the locked state is applied to the hand when the user touches the hand in the tactile read mode, the position of the hand may change. In this case, the hand indicates a time different from the time stored in the storage unit 109 in step S210 (that is, the time when the hand movement of the hand is stopped). Even in such a case, the control circuit 103 can correct the position of the hand to a position indicating a current time.

As described above, the watch 1 according to the present embodiment supplies the lock pulse to the stepping motor 111 when shifted to the tactile read mode. According to the watch 1 according to the present embodiment configured as described above, since the lock pulse is supplied only in the tactile read mode, it is possible to apply a braking force to the hand while reducing power consumption.

In general, in the tactile read watch, a positional deviation of the hand is likely to occur when the user touches the hand. Therefore, it is desirable to perform a time correction operation of automatically correcting the hand to the actual time. When the time correction operation is performed, the position of the hand is detected. When the position of the hand is detected based on the load change or the optical characteristic change of the gear as described above, it is possible to improve an accuracy of position detection or position the hand in a short time using an hour and minute independent type gearbox in which the hour hand and the minute hand are driven by the separate motors. On the other hand, the hour and minute independent type gearbox has a relatively small gear ratio (reduction ratio) as compared with a so-called middle two-hand train wheel. Therefore, when the hour and minute independent type gearbox is used, a holding force (holding torque) for holding the position of the hand is relatively small, and the position of the hand is likely to deviate.

According to the watch 1 according to the present embodiment, it is possible to improve the accuracy of position detection and achieve both positioning of the hand in a short time and reduction of the positional deviation of the hand by supplying the lock pulse in the tactile read mode while using the hour and minute independent type gearbox.

Since the watch 1 according to the present embodiment detects that the cover 5 (cover) is opened and then shifts the operation mode to the tactile read mode, the watch 1 can shift to the tactile read mode before the user touches the hand.

As described above, the watch 1 according to the present embodiment may include the capacitance detection unit that detects the capacitance of the dial 4. In this case, even when the watch 1 does not include the cover 5 (cover), the watch 1 can detect an action of the user about to touch the hand, and can shift to the tactile read mode before the user touches the hand.

The watch 1 according to the present embodiment detects the rotation (or vibration) of the rotor during the output of the lock pulse. According to the watch 1 configured as described above, when the rotor no longer rotates (or vibrates) during the output of the lock pulse, the lock pulse can be quickly stopped. Therefore, according to the watch 1 according to the present embodiment, it is possible to prevent the output of the lock pulse from continuing unnecessarily and to reduce the power consumption.

The watch 1 according to the present embodiment includes the boosting circuit that boosts the lock pulse. According to the watch 1 configured as described above, the braking force of the hand can be further increased, and the positional deviation of the hand can be further reduced.

Although the embodiments of the invention have been described in detail with reference to the drawings, specific configurations are not limited to the embodiments, and various modifications can be made without departing from the scope of the invention. The configurations described in the above-described embodiments may be combined.

Each unit of each device in the above-described embodiments may be implemented by dedicated hardware, or may be implemented by a memory and a microprocessor.

Each unit of each device may be implemented by a memory and a central processing unit (CPU), and may implement a function of each unit of each device by loading a program for implementing the function into the memory and executing the program.

Processing by each unit of the control unit may be executed by recording the program for implementing the function of each unit of each device in a computer-readable recording medium, and reading the program recorded in the recording medium into a computer system and executing the program. Here, the "computer system" includes hardware such as an OS and a peripheral device.

The "computer system" includes a homepage providing environment (or display environment) when a WWW system is used.

The "computer-readable recording medium" refers to a storage device such as a portable medium such as a flexible disk, a magneto-optical disk, a ROM and a CD-ROM, and a hard disk built in a computer system. The "computer-readable recording medium" may also include a recording medium that retains a program dynamically for a short time, such as a communication line for transmitting a program via a network such as the Internet or a communication line such as a telephone line, or a recording medium that retains a program for a predetermined time, such as a volatile memory in a computer system serving as a server or a client in this case. The program may be a program for implementing some of the above functions, or may be a program capable of implementing the above functions in combination with a program already recorded in the computer system.

What is claimed is:

1. A watch comprising:
a plurality of hands;
a plurality of motors configured to drive or brake the plurality of hands, respectively;
a pulse generation unit configured to supply, to the plurality of motors, a drive pulse for driving the hands and a lock pulse for braking the hands; and
a control unit configured to control an operation mode including a normal hand movement mode and a tactile read mode, wherein
the pulse generation unit supplies the lock pulse to the motors when the control unit shifts the operation mode to the tactile read mode.

2. The watch according to claim 1, further comprising:
an opening and closing switch configured to detect opening and closing of a cover for the hands, wherein
the control unit shifts the operation mode to the tactile read mode by detecting, by the opening and closing switch, that the cover is opened.

3. The watch according to claim 1, further comprising:
a dial having a surface on which the hand moves; and
a capacitance detection unit configured to detect a capacitance of the dial, wherein
the control unit shifts the operation mode to the tactile read mode based on a change in the capacitance detected by the capacitance detection unit.

4. The watch according to claim 1, wherein
each of the motors is a two-coil motor including a first coil and a second coil, and
the lock pulse excites only the first coil.

5. The watch according to claim 4, wherein
the control unit stops an output of the lock pulse after an electromotive force generated in the second coil due to rotation of a rotor of the motor is no longer detected during the output of the lock pulse.

6. The watch according to claim 5, further comprising:
a hand position detection unit configured to detect a position indicated by the hand, wherein
the operation mode includes a hand position correction mode, and
the control unit shifts the operation mode to the hand position correction mode after the output of the lock pulse ends, and performs time correction based on a detection result of the indicated position obtained by the hand position detection unit.

7. A watch comprising:
a plurality of hands;
a plurality of two-coil motors each including a first coil and a second coil, and configured to drive or brake the plurality of hands, respectively;

a pulse generation unit configured to supply, to the plurality of motors, a drive pulse for driving the plurality of hands and a lock pulse for braking the plurality of hands; and a control unit configured to control an operation mode including a normal hand movement mode and a tactile read mode, wherein in the tactile read mode, in a standby state in which a circuit of the first coil is opened and a circuit of the second coil is closed, when the control unit detects an electromotive force generated in the second coil due to rotation of a rotor of the motor, the control unit causes the lock pulse to perform excitation.

8. A watch comprising:

a plurality of hands;

a plurality of two-coil motors each including a first coil and a second coil, and configured to drive or brake the plurality of hands, respectively;

a pulse generation unit configured to supply, to the plurality of motors, a drive pulse for driving the plurality of hands and a lock pulse for braking the plurality of hands; and a control unit configured to control an operation mode including a normal hand movement mode and a tactile read mode, wherein in the tactile read mode, in a standby state in which at least one circuit of the first coil and the second coil is closed, when the control unit detects an electromotive force generated in the first coil or the second coil due to rotation of a rotor of the motor, only the first coil is excited by the lock pulse.

9. The watch according to claim 8, further comprising:

a boosting unit configured to boost the lock pulse.

10. The watch according to claim 8, wherein the control unit stops an output of the lock pulse after the electromotive force generated in the second coil due to the rotation of the rotor is no longer detected during the output of the lock pulse.

11. The watch according to claim 9, wherein the control unit stops an output of the lock pulse after the electromotive force generated in the second coil due to the rotation of the rotor is no longer detected during the output of the lock pulse.

12. The watch according to claim 10, further comprising:

a hand position detection unit configured to detect a position indicated by the hand, wherein the operation mode includes a hand position correction mode, and the control unit shifts the operation mode to the hand position correction mode after the output of the lock pulse ends, and performs time correction based on a detection result of the indicated position obtained by the hand position detection unit.

* * * * *